United States Patent
Okazawa

(10) Patent No.: US 9,813,687 B1
(45) Date of Patent: Nov. 7, 2017

(54) IMAGE-CAPTURING DEVICE, IMAGE-PROCESSING DEVICE, IMAGE-PROCESSING METHOD, AND IMAGE-PROCESSING PROGRAM

(71) Applicant: OLYMPUS CORPORATION, Hachioji-shi, Tokyo (JP)

(72) Inventor: Atsuro Okazawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/607,488

(22) Filed: May 27, 2017

Related U.S. Application Data

(63) Continuation of application No. PCT/JP2016/065130, filed on May 23, 2016.

(51) Int. Cl.
*H04N 5/232* (2006.01)
*H04N 5/369* (2011.01)
*H04N 9/64* (2006.01)
*H04N 9/04* (2006.01)
*H04N 9/07* (2006.01)

(52) U.S. Cl.
CPC ......... *H04N 9/646* (2013.01); *H04N 5/23212* (2013.01); *H04N 5/3696* (2013.01); *H04N 9/045* (2013.01); *H04N 9/07* (2013.01)

(58) Field of Classification Search
CPC .......... H04N 9/646; H04N 9/07; H04N 9/045; H04N 5/23212; H04N 5/3696
See application file for complete search history.

(56) References Cited

U.S. PATENT DOCUMENTS

| | | | |
|---|---|---|---|
| 6,829,008 B1 | 12/2004 | Kondo et al. | |
| 9,147,705 B2 * | 9/2015 | Ishiwata | H01L 27/14603 |
| 9,293,504 B2 * | 3/2016 | Ootsuka | H01L 27/14621 |

(Continued)

FOREIGN PATENT DOCUMENTS

| | | | |
|---|---|---|---|
| JP | 2000156823 A | 6/2000 | |
| JP | 2007279597 A | 10/2007 | |

(Continued)

OTHER PUBLICATIONS

International Search Report (ISR) and Written Opinion dated Jul. 26, 2016 issued in International Application No. PCT/JP2016/065130.

Primary Examiner — Hung Lam
(74) Attorney, Agent, or Firm — Holtz, Holtz & Volek PC

(57) ABSTRACT

An image-capturing device includes: an image-capturing element in which a plurality of pixels, which have different spectral sensitivities, are arrayed in a two-dimensional matrix manner, and phase-difference detection pixels are arranged as some of the pixels; a phase-difference pixel discriminating unit that classifies the phase-difference detection pixels arranged in the image-capturing element as first pixels, which have a spectral sensitivity at which degradation of image quality is more difficult to discern for human eyes than the other spectral sensitivities, and second pixels which are the phase-difference detection pixels other than the first pixels; and a phase-difference pixel value correcting unit that subjects the first pixels classified by the phase-difference pixel discriminating unit to correction processing of a lower precision than that for the second pixels.

6 Claims, 13 Drawing Sheets

(56) References Cited

U.S. PATENT DOCUMENTS

| | | | |
|---|---|---|---|
| 9,377,601 B2 * | 6/2016 | Kusaka | G02B 7/34 |
| 9,549,673 B2 * | 1/2017 | Akita | A61B 3/1241 |
| 9,577,012 B2 * | 2/2017 | Ooki | H01L 27/14621 |
| 2007/0237429 A1 | 10/2007 | Kusaka | |
| 2007/0237512 A1 | 10/2007 | Kusaka | |
| 2009/0096903 A1 | 4/2009 | Kusaka | |
| 2009/0278966 A1 | 11/2009 | Kusaka | |
| 2010/0091161 A1 | 4/2010 | Suzuki | |

FOREIGN PATENT DOCUMENTS

| | | | |
|---|---|---|---|
| JP | 2007282107 A | 10/2007 | |
| JP | 2007282109 A | 10/2007 | |
| JP | 2008312073 A | 12/2008 | |
| JP | 2009094881 A | 4/2009 | |
| JP | 2015230385 A | 12/2015 | |
| WO | 2008032820 A1 | 3/2008 | |

* cited by examiner

IMAGE-CAPTURING DEVICE, IMAGE-PROCESSING DEVICE, IMAGE-PROCESSING METHOD, AND IMAGE-PROCESSING PROGRAM

CROSS-REFERENCE TO RELATED APPLICATIONS

This application is a Continuation Application of International Application No. PCT/JP2016/065130 filed on May 23, 2016. The content of International Application No. PCT/JP2016/065130 is hereby incorporated herein by reference in its entirety.

TECHNICAL FIELD

The present invention relates to an image-capturing device, an image-processing device, an image-processing method, and an image-processing program.

BACKGROUND ART

There is a known image-capturing element that converts an optically formed optical image into an electrical signal. The image-capturing element includes pixels that output signals for focus detection (for example, refer to PTL 1).

In order to provide some pixels of the image-capturing element with a distance-measuring function that utilizes a pupil phase-difference method (hereafter, referred to as phase-difference detection pixels), light-receiving surfaces of the phase-difference detection pixels are partially shielded from light.

Although it would be desirable to arrange the phase-difference detection pixels over the entire surface of the image-capturing element so as to allow the distance to a subject to be correctly measured at every frequency, the image quality would be degraded due to reduction of the number of pixels that form an image when the number of phase-difference detection pixels is increased. In order to prevent such degradation of image quality, a method has been proposed in which phase-difference detection pixels are arranged in a distributed manner.

When phase-difference detection pixels are arranged so as to be concentrated in only pixels having a specific spectral sensitivity in the case where the phase-difference detection pixels are arranged with high density in a so-called Bayer array image-capturing element, for example, degradation of the information of this spectral sensitivity is significant, and therefore, phase-difference detection pixels are instead arranged in a distributed manner across pixels having different spectral sensitivities.

Since the phase-difference detection pixels are partially shielded from light as described above, the outputs of the phase-difference detection pixels cannot be used as pixel data without being altered, and therefore a method has been proposed in which the outputs are corrected using the output values of the surrounding pixels (for example, refer to PTL 2). In the correction method disclosed in PTL 2, for example, the output value of a phase-difference detection pixel is accurately corrected by determining the edge patterns and the like of surrounding pixels in the region surrounding the phase-difference detection pixel, and adjusting the use ratio between the output value of the phase-difference detection pixel and the output values of the surrounding pixels in accordance with the extent of the edge patterns.

CITATION LIST

Patent Literature

{PTL 1} Japanese Unexamined Patent Application, Publication No. 2000-156823
{PTL 2} Japanese Unexamined Patent Application, Publication No. 2007-282107

SUMMARY OF INVENTION

An image-capturing device according to a first aspect of the present invention includes: an image-capturing element in which a plurality of pixels, which have different spectral sensitivities, are arrayed in a two-dimensional matrix manner and in which phase-difference detection pixels are arranged as some of the pixels; a phase-difference pixel discriminating unit that classifies the phase-difference detection pixels arranged in the image-capturing element as first pixels, the first pixels having a spectral sensitivity at which discerning degradation of image quality is more difficult for human eyes than the other of the spectral sensitivities, and second pixels which are the phase-difference detection pixels other than the first pixels; and a phase-difference pixel value correcting unit that subjects the first pixels classified by the phase-difference pixel discriminating unit to correction processing of a lower precision than that for the second pixels.

BRIEF DESCRIPTION OF DRAWINGS

FIG. 2 illustrates an example of a pixel array of an image-capturing element of the image-capturing device in FIG. 1.

FIG. 7A illustrates regions in which upper-opening phase-difference detection pixels and lower-opening phase-difference detection pixels in the example of the pixel array in FIG. 2 are extracted and subjected to pixel mixing.

FIG. 7B illustrates regions in which left-opening phase-difference detection pixels and right-opening phase-difference detection pixels in the example of the pixel array in FIG. 2 are extracted and subjected to pixel mixing.

FIG. 8A illustrates an example of the pixel array after pixel mixing has been performed on the pixels in FIG. 7A.

FIG. 8B illustrates an example of the pixel array after pixel mixing has been performed on the pixels in FIG. 7B.

DESCRIPTION OF EMBODIMENTS

Hereafter, an image-capturing device 1, an image-processing device 16, an image-processing method, and an image-processing program according to an embodiment of the present invention will be described with reference to the drawings.

Figure 1:
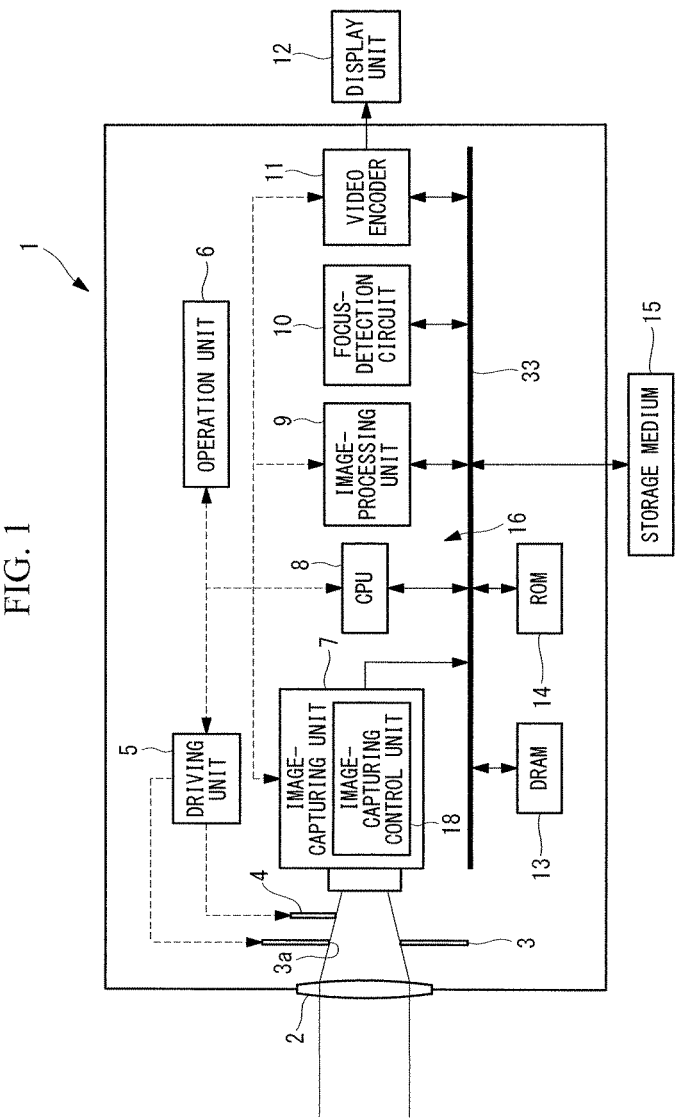
FIG. 1 is a block diagram illustrating an image-capturing device according to an embodiment of the present invention.

As illustrated in FIG. 1, the image-capturing device 1 according to this embodiment is a digital camera, and includes a photographic lens 2, an aperture 3, a mechanical shutter 4, a driving unit 5, an operation unit 6, an image-capturing unit 7, a CPU 8, an image-processing unit 9, a focus-detection circuit 10, a video encoder 11, a display unit 12, a DRAM 13, a ROM 14, and a storage medium 15.

The image-processing device 16 according to this embodiment is formed of the image-capturing unit 7 and the image-processing unit 9.

The photographic lens 2 is an optical system that is formed of at least one lens that collects light from a subject, and the photographic lens may be a single focus lens or may be a zoom lens. The aperture 3 is provided such that an opening diameter 3a thereof can be adjusted in order to adjust the amount of luminous flux of light collected by the photographic lens 2. The mechanical shutter 4 is arranged after the aperture 3 and is provided such that the mechanical shutter 4 can open and close. An exposure time can be adjusted by adjusting an opening time of the shutter 4. A known focal plane shutter, lens shutter, or the like is employed as the mechanical shutter 4. The driving unit 5 adjusts the position of the photographic lens 2 in an optical axis direction thereof, the opening diameter 3a of the aperture 3, and operation of opening/closing the mechanical shutter 4 on the basis of command signals from the CPU 8.

The operation unit 6 includes a various operation members, such as various operation buttons including a power button, a release button, a playback button, and a menu button, and a touch panel.

The image-capturing unit 7 includes an image-capturing element 17 and an image-capturing control unit 18.

The image-capturing element 17 is arranged after the mechanical shutter 4 along the optical axis of the photographic lens 2, and is arranged at a position at which an image of the subject is formed by the photographic lens 2.

The image-capturing element 17 is formed by arraying photodiodes, each of which constitutes a pixel, in a two-dimensional matrix. Each photodiode generates a charge in accordance with the amount of light received by the photodiode. The charge generated by the photodiode accumulates in a capacitor connected to the photodiode, and the charge is then read out as an image signal. In this embodiment, the image-capturing element 17 employs a plurality of method which are for reading out the charges and which are different from each other. The charges that have accumulated in the capacitors are read out in accordance with a control signal from the image-capturing control unit 18.

For example, Bayer array color filters are arranged on front surfaces of the photodiodes, which form the pixels. A Bayer array is formed by arraying, in an alternating manner, a line in which R pixels and G (Gr) pixels are arrayed in an alternating manner in a horizontal direction and a line in which G (Gb) pixels and B pixels are arrayed in an alternating manner in the horizontal direction such that the positions of the Gr pixels in the lines are shifted from the positions of the Gb pixels in the lines in the horizontal direction. Thus, pixel groups are repeatedly arrayed in the vertical and horizontal directions, wherein each pixel group includes four pixels, namely, an R pixel, a Gr pixel, a Gb pixel and a B pixel being arrayed in a 2×2 matrix manner.

In this embodiment, some of the pixels of the image-capturing element 17 function as phase-difference detection pixels. In other words, the image-capturing element 17 includes normal pixels, which are for obtaining an image to be recorded or displayed, and the phase-difference detection pixels. The phase-difference detection pixels are different from the normal pixels and are partially shielded from light.

Figure 2:
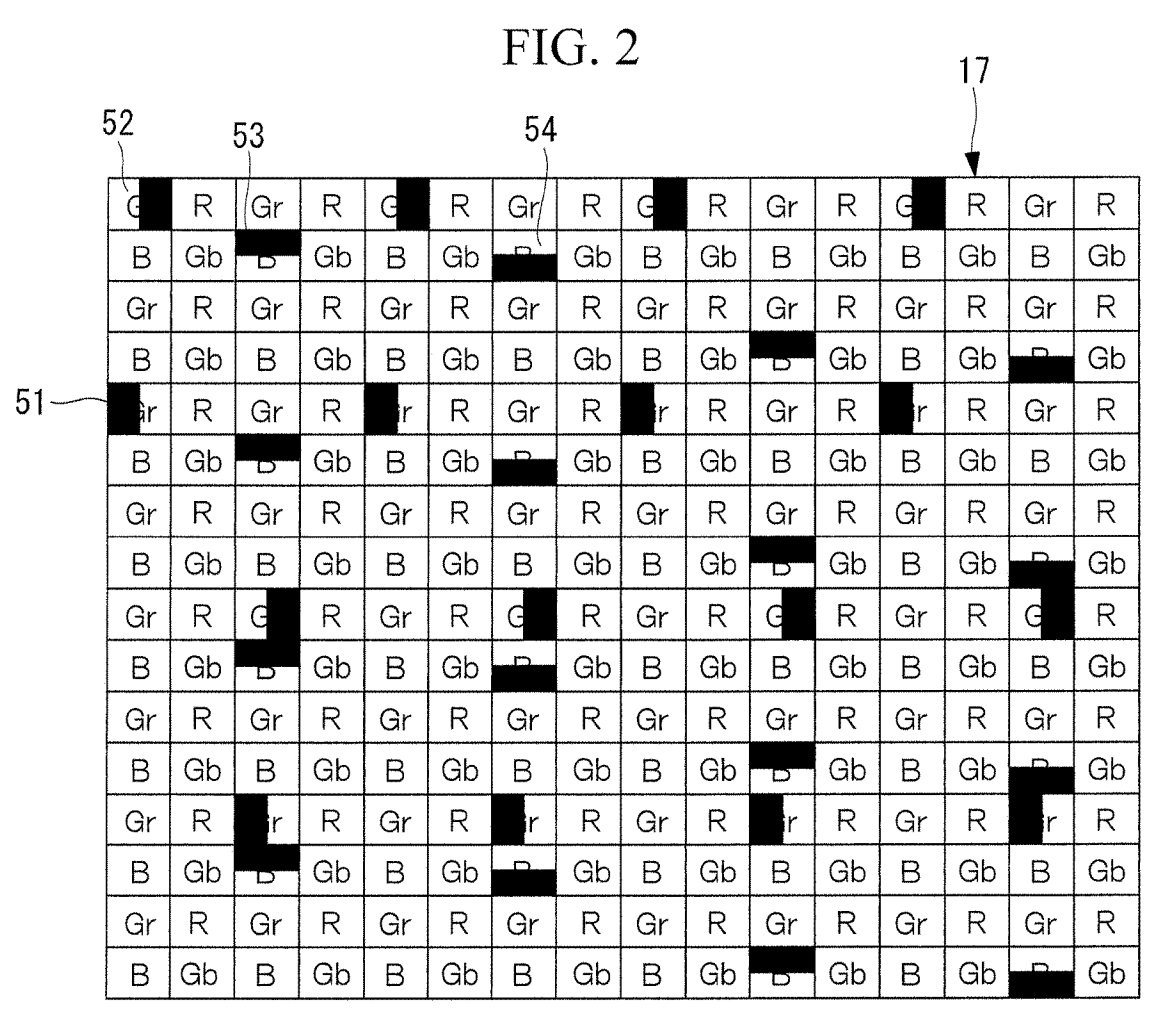

FIG. 2 illustrates an example of a pixel array of the image-capturing element 17. In FIG. 2, R represents R pixels in which red color filters are provided, Gr and Gb represent G pixels in which green color filters are provided, and B represents B pixels in which blue color filters are provided. The black-shaded parts represent light-blocking films.

The upper, lower, left, or right half of each phase-difference detection pixel is shielded from light by a light-blocking film.

In this embodiment, a right-opening phase-difference detection pixel 51, which has the left half of the surface thereof shielded from light, and a left-opening phase-difference detection pixel 52, which has the right half of the surface thereof shielded from light, are provided at the positions of every other Gr pixel in the vertical and horizontal directions, and a lower-opening phase-difference detection pixel 53, which has the upper half of the surface thereof shielded from light, and an upper-opening phase-difference detection pixel 54, which has the lower half of the surface thereof shielded from light, are provided at the positions of every other B pixel in the vertical and horizontal directions.

In the case of the image-capturing element 17, which has a large number of pixels, each of the surface areas of the pixels are small, and therefore it is possible to assume that substantially the same image of the subject is formed in the adjacent pixels that are arranged close to each other. Therefore, as a result of the phase-difference detection pixels being arranged as illustrated in FIG. 2, it is possible to detect a phase difference in the horizontal direction between a pair of pixels consisting of a right-opening phase-difference detection pixel 51 and a left-opening phase-difference detection pixel 52, which are close to each other. In addition, a phase difference in the vertical direction can be detected using a pair of pixels consisting of a lower-opening phase-difference detection pixel 53 and an upper-opening phase-difference detection pixel 54 that are close to each other.

Since each phase-difference detection pixel is partially shielded from light, the amounts of light detected in the pixels are reduced. The reductions in the amount of light differ depending on the surface areas of the light-blocking films provided on the phase-difference detection pixels, and also differ depending on the positions of the light-blocking films, the angle of incident light, and the image height.

The image-capturing control unit 18 sets a reading method for the image-capturing element 17 in accordance with a command signal from the CPU 8, and controls reading of image data from the image-capturing element 17 in accordance with the set reading method. The image-capturing control unit 18 performs processing to correct signals obtained by the phase-difference detection pixels.

The method of reading pixel data from the image-capturing element 17 is set in accordance with the image-capturing mode (operation mode) of the digital camera. For example, in the case where a real-time property is required when reading the pixel data out from the image-capturing element 17 (for example, at the time of live view display or moving image recording), pixel data from a plurality of pixels of the same color is mixed together and read out or the pixel data of specific pixels are thinned down and read out such that the pixel data can be read out at high speed. In contrast, in the case where high image quality is more important than a real-time property (for example, at the time of still image recording), the pixel data of all the pixels are read out rather than performing mixing reading or thinning reading.

Figure 3:
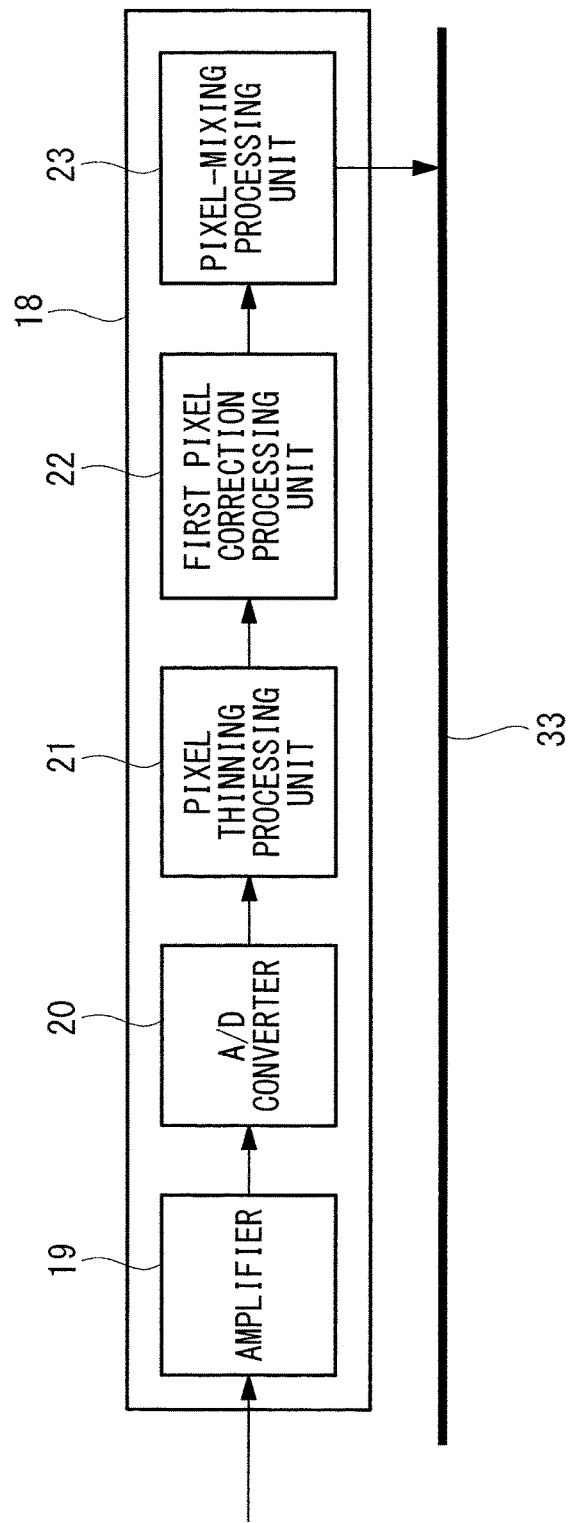
FIG. 3 is a block diagram illustrating an image-capturing control unit of an image-capturing unit of the image-capturing device in FIG. 1.

As illustrated in FIG. 3, the image-capturing control unit 18 includes an amplifier 19, an A/D converter 20, a pixel thinning processing unit 21, a first pixel correction processing unit 22, and a pixel mixing processing unit (number-of-pixels-reducing unit) 23.

The amplifier 19 performs gain adjustment (amplification) on the pixel data output from the image-capturing element 17.

The A/D converter 20 converts pixel data, which is composed of an analog signal that has been amplified by the amplifier 19, into a digital signal.

Hereafter, in this embodiment, a group of a plurality of pieces of pixel data will be referred to as "image data", and the values of the individual pixels represented by the pixel data will be referred to as "pixel values".

The first pixel correction processing unit 22 performs processing involved in correcting the pixel data obtained in the phase-difference detection pixels. That is, the first pixel correction processing unit 22 corrects pixel data obtained in the phase-difference detection pixels by using pixel data obtained in the surrounding normal pixels when a light exposure is performed to obtain an image. In addition, the pixel data obtained by the phase-difference detection pixels are written into the DRAM 13 without being corrected when a focus-detection light exposure is performed.

Figure 4:
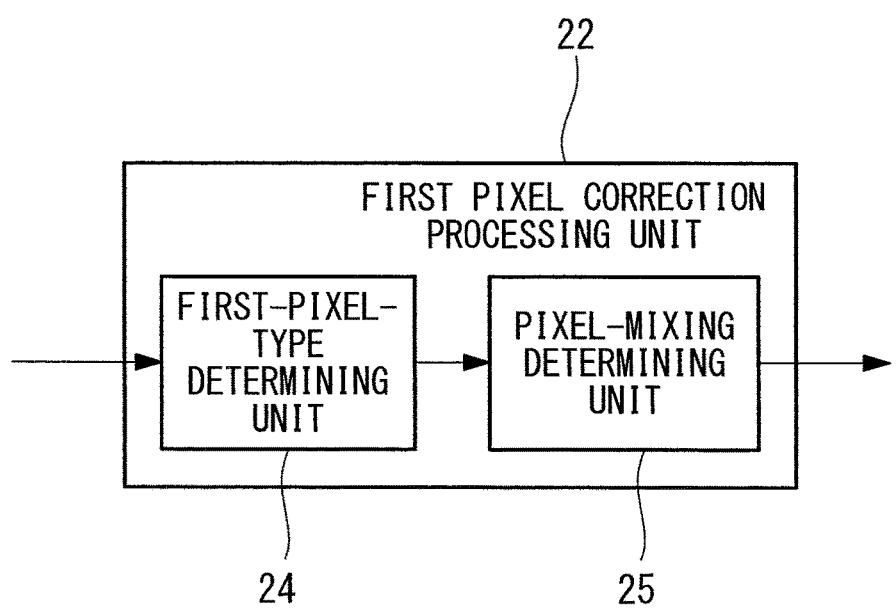
FIG. 4 is a block diagram illustrating a first pixel correction processing unit of the image-capturing control unit in FIG. 3.

As illustrated in FIG. 4, the first pixel correction processing unit 22 includes a first-pixel-type determining unit (phase-difference pixel discriminating unit) 24 and a pixel-mixing determining unit (phase-difference pixel value correcting unit) 25. The first-pixel-type determining unit 24 selects a phase-difference detection pixel that is to be corrected in the image-capturing control unit 18 from among the phase-difference detection pixels. That is, the first-pixel-type determining unit 24 discriminates whether a phase-difference detection pixel that is to be corrected in the image-capturing control unit 18 is arranged at the position of a blue color filter, is arranged at the position of a green color filter, or is arranged at another position.

On the basis of a determination result of the first-pixel-type determining unit 24, the pixel-mixing determining unit 25 generates a pixel value for correcting a phase-difference pixel, which is a correction target, or performs flag processing to instruct that the target pixel is not to be subjected to mixing in the pixel-mixing determining unit 25, which is a latter stage.

Specific operations of the first pixel correction processing unit 22 will be described later.

The CPU 8 controls the entire digital camera in accordance with a program stored in the ROM 14.

For example, the image-processing unit 9 is formed of an ASIC, reads pixel data from the DRAM 13 and performs image processing on the pixel data, and writes the processed pixel data back into the DRAM 13 as display image data. For example, the image-processing unit 9 performs image processing for still image recording at the time of still image recording, performs image processing for moving image recording at the time of moving image recording, and performs image processing for display at the time of live view display.

Figure 5:
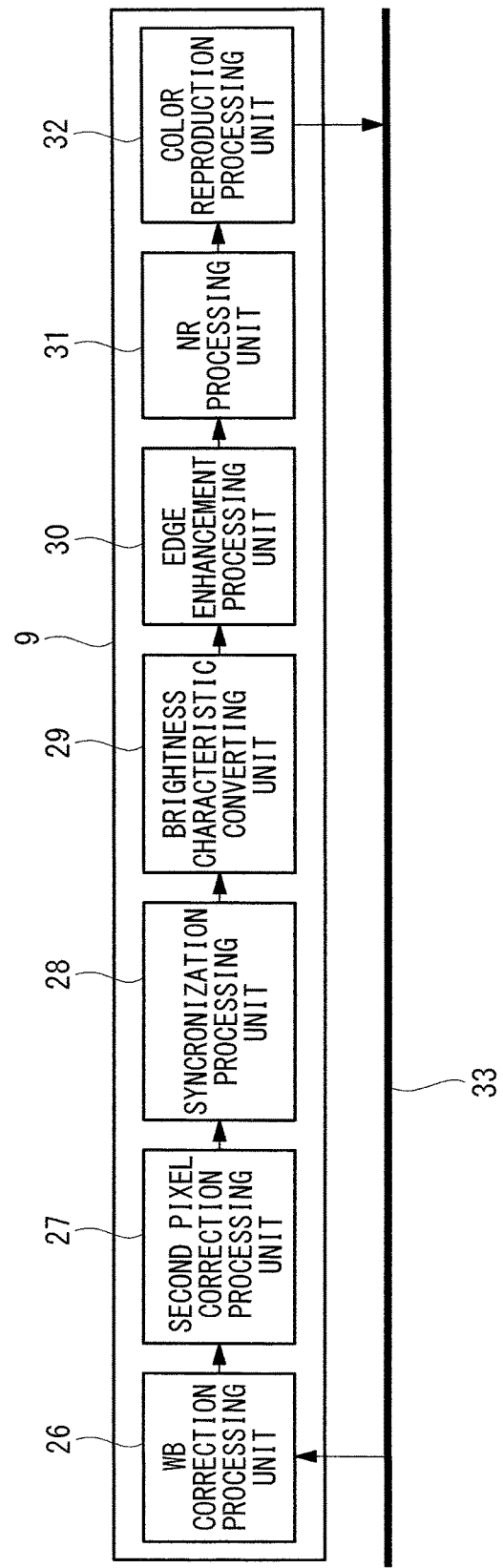
FIG. 5 is a block diagram illustrating an image-processing unit of the image-capturing device in FIG. 1.

In more detail, as illustrated in FIG. 5, the image-processing unit 9 includes a white balance (WB) correction processing unit 26, a second pixel correction processing unit 27, a synchronization processing unit 28, a brightness characteristic converting unit 29, an edge enhancement processing unit 30, a noise reduction (NR) processing unit 31, and a color reproduction processing unit 32.

The WB correction processing unit 26 is a circuit that corrects the color balance of an image by amplifying the color components of the image data by a prescribed gain amount.

The second pixel correction processing unit 27 performs processing involved in correcting the pixel data obtained in the phase-difference detection pixels. In particular, the second pixel correction processing unit 27 is a circuit that corrects phase-difference detection pixels that have not been corrected by the first pixel correction processing unit 22. The details of the processing performed by the second pixel correction processing unit 27 will be described later.

The synchronization processing unit 28 is, for example, a circuit that converts image data in which one pixel corresponds to one color component into image data in which one pixel corresponds to a plurality of color components for image data for which the color filters of the image-capturing element 17 correspond to a Bayer array and that is output via the image-capturing element 17.

The brightness characteristic converting unit 29 is a circuit that converts the brightness characteristics of the image data generated in the synchronization processing unit 28 so as to make the image data suitable for being displayed or recorded.

The edge enhancement processing unit 30 is a circuit that enhances edge components of target image data by multiplying edge signals extracted from image data output from the brightness characteristic converting unit 29 using a band pass filter or the like by an edge enhancement coefficient, and adding the result of this operation to the original image data.

The NR processing unit 31 is a circuit that removes a noise component from the image data output from the edge enhancement processing unit 30 using coring processing or the like.

The color reproduction processing unit 32 performs various processing operations in order to realize appropriate color reproduction for the image. For example, color matrix computation processing and so forth are performed in the color reproduction processing unit 32. The color matrix computation processing is processing in which image data is multiplied by a color matrix coefficient in accordance with a white balance mode, for example. In addition, color saturation and hue correction processing and so forth are also performed in the color reproduction processing unit 32.

The focus-detection circuit 10 is formed of an ASIC, for example, and reads pixel data obtained by the phase-difference detection pixels out from the DRAM 13. The focus-detection circuit 10 performs processing related to detecting a focus on the basis of data obtained by the phase-difference detection pixels.

The video encoder 11 reads out display image data, which has been generated by the image-processing unit 9 and is temporarily stored in the DRAM 13, and outputs the read-out display image data to the display unit 12.

The display unit 12 is a liquid crystal display, an organic EL display or the like, and displays an image in accordance with the display image data input from the video encoder 11. The display unit 12 is used in live view display, recorded image display, or the like.

A bus 33 is connected to the image-capturing control unit 18, the CPU 8, the image-processing unit 9, the focus-detection circuit 10, the video encoder 11, the DRAM 13, the ROM 14, the storage medium 15, and so forth. The various types of data generated by these units are transmitted via the bus 33.

The DRAM 13 is an electrically rewritable memory, and temporarily stores various types of data such as image data (pixel data), recording image data, display image data and processing data used in the CPU 8. An SDRAM may be used instead of the DRAM 13.

The ROM 14 is a non-volatile memory such as a mask ROM or a flash memory, and stores various types of data such as a program and digital camera adjustment values used by the CPU 8.

The storage medium 15 is removably installed in the digital camera, and stores recording image data as image files of a prescribed format.

The first pixel correction processing unit 22 switches the correction processing in accordance with the density of the phase-difference detection pixels and the spectral sensitivity of the pixels where the phase-difference detection pixels are arranged.

Next, the density of the phase-difference detection pixels will be described.

Figure 7A:
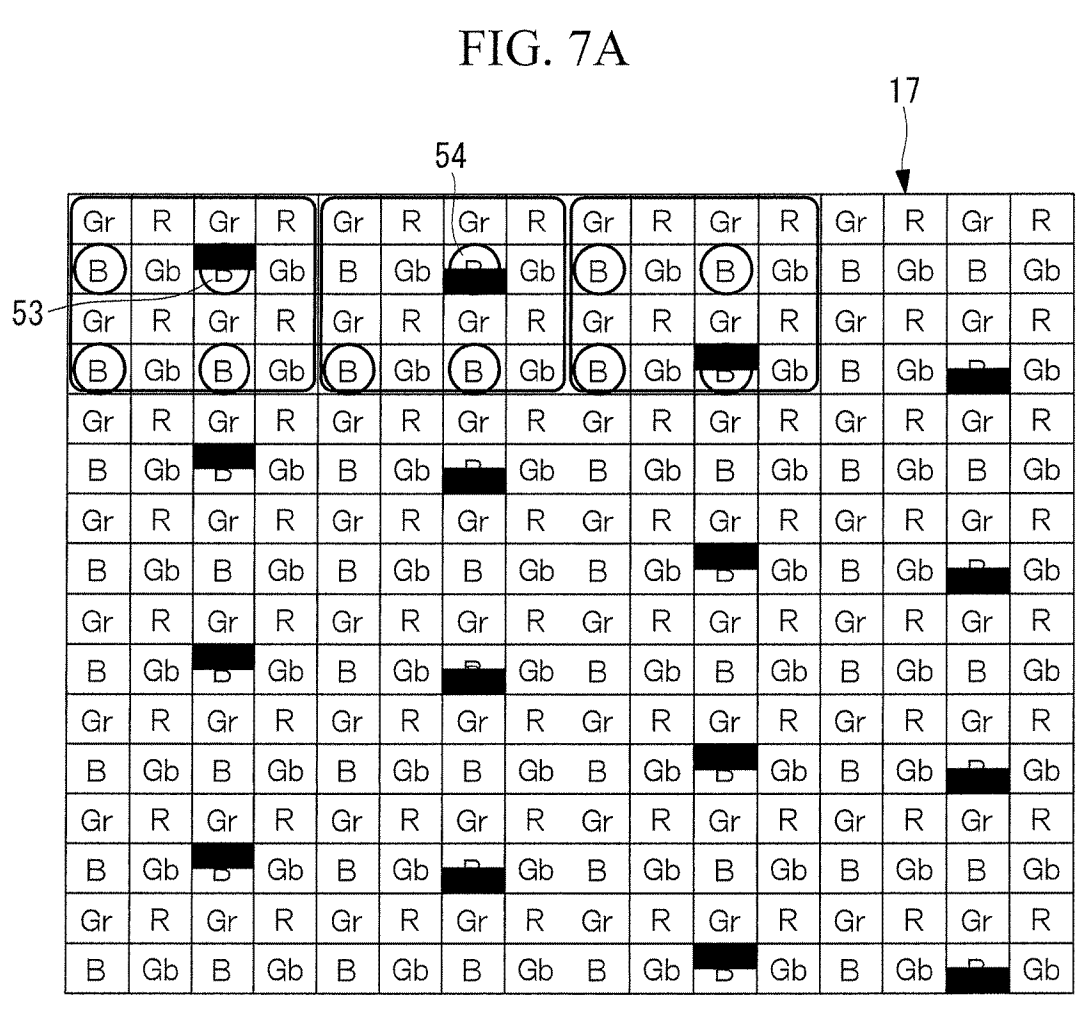

FIG. 7A illustrates only the upper-opening phase-difference detection pixels 54 and the lower-opening phase-difference detection pixels 53, which are arranged in pixels where blue filters are provided, from among the phase-difference detection pixels of the image-capturing element 17 illustrated in FIG. 2.

Figure 7B:
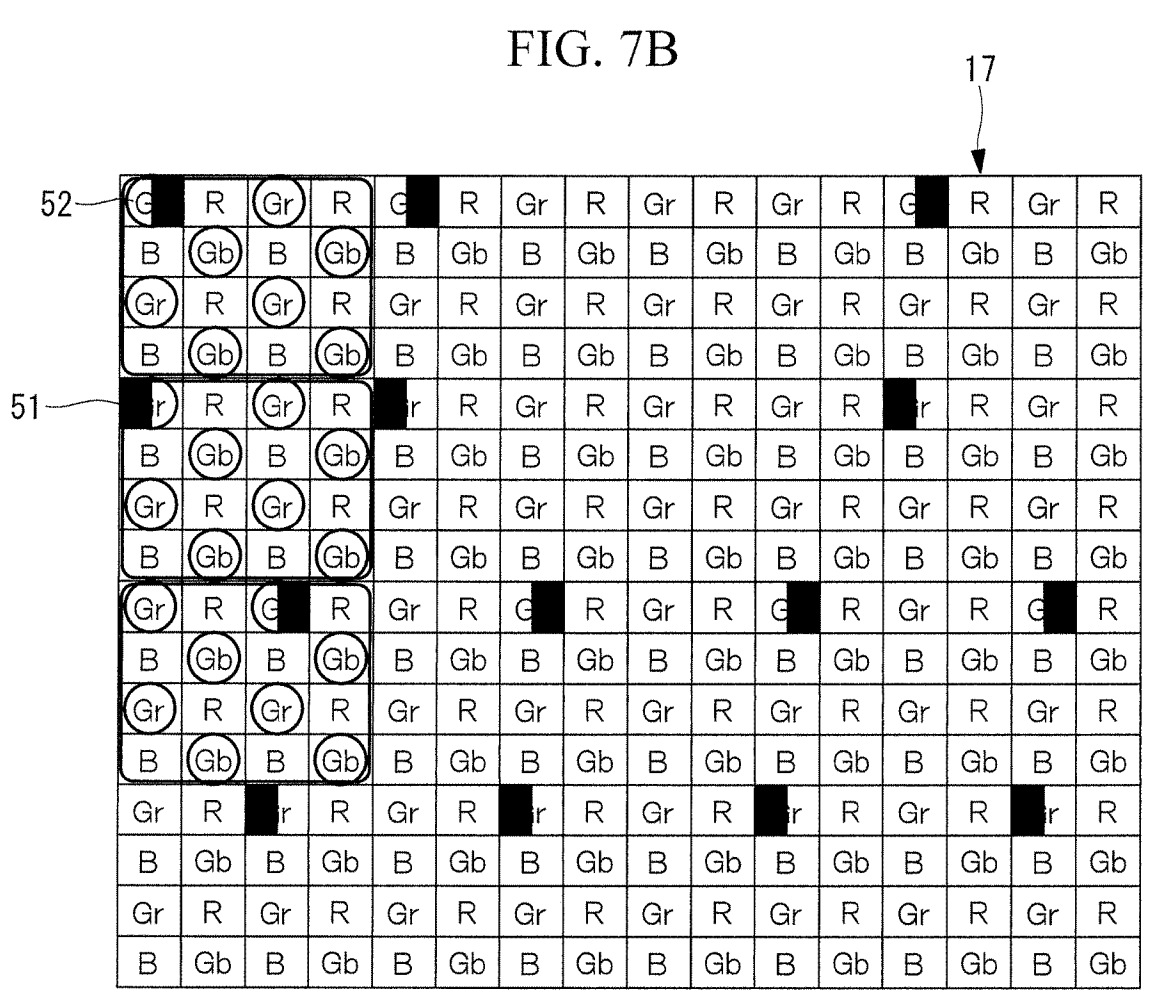

FIG. 7B illustrates only the left-opening phase-difference detection pixels 52 and the right-opening phase-difference detection pixels 51, which are arranged in pixels where green filters are provided, from among the phase-difference detection pixels of the image-capturing element 17 illustrated in FIG. 2.

For example, in an example in which two pixels of the same color in the horizontal direction and two pixels of the same color in the vertical direction are mixed together inside the pixel mixing processing unit 23 in moving image recording, one upper-opening phase-difference detection pixel 54 or lower-opening phase-difference detection pixel 53, and three normal pixels are mixed together as indicated by the chain lines in FIG. 7A for pixels where blue filters are provided. Similarly, one left-opening phase-difference detection pixel 52 or right-opening phase-difference detection pixel 51 and three normal pixels are mixed together as indicated by the chain lines in FIG. 7B for pixels where green filters are provided.

Figures 8A, 8B:
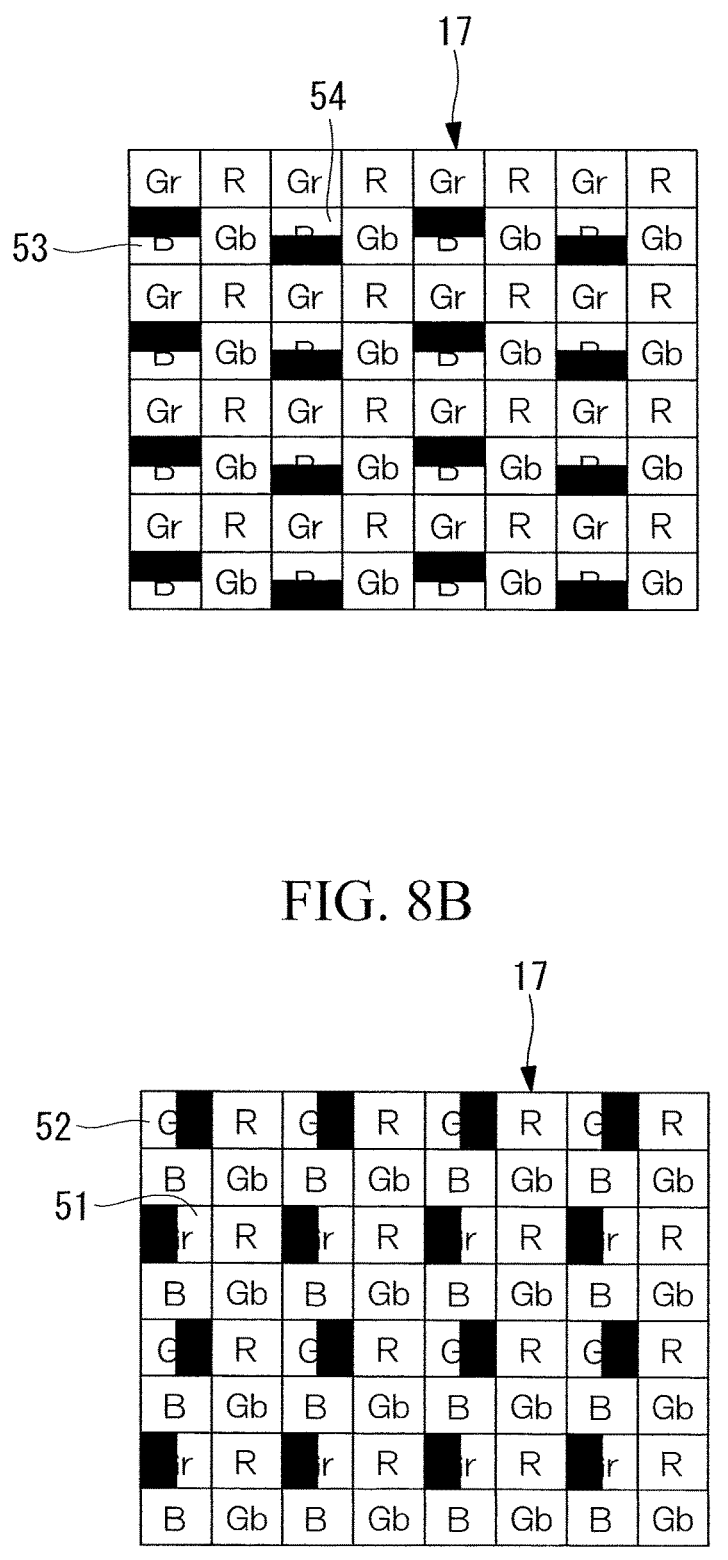

As illustrated in FIGS. 8A and 8B, in the image data arranged on the DRAM 13 after being subjected to pixel mixing by the pixel mixing processing unit 23, an upper-opening phase-difference detection pixel 54 or a lower-opening phase-difference detection pixel 53 is arranged in all the pixels where a blue filter is provided and a left-opening phase-difference detection pixel 52 or a right-opening phase-difference detection pixel 51 is arranged in all the Gr pixels where a green filter is provided.

In this case, a density x of the phase-difference detection pixels refers to a ratio of the number of phase-difference detection pixels to the number of pixels of the same color in the image data before the image mixing processing is performed, and a density y of the phase-difference detection pixels refers to a ratio of the number of phase-difference detection pixels to the number of pixels of the same color in the image data arranged on the DRAM 13 after the image mixing processing has been performed.

Specifically, in the image data before pixel mixing illustrated in FIG. 7A, the ratio of the phase-difference detection pixels to all the B pixels where blue filters are provided is 1 to 4 pixels, i.e., the density x=1/4. In contrast, in the image data after pixel mixing illustrated in FIG. 8A, all the B pixels where blue filters are provided are phase-difference detection pixels, and therefore the density y=1.

In addition, in the image data before pixel mixing illustrated in FIG. 7B, the ratio of the phase-difference detection pixels to all of the Gr pixels and Gb pixels where green filters are provided is 1 to 8 pixels, i.e., the density x=1/8. In contrast, the density y=1/2 in the image data after pixel mixing illustrated in FIG. 8B.

In the first pixel correction processing unit 22, first, it is determined whether a processing target pixel is a phase-difference detection pixel, and, in the case where the processing target pixel is a phase-difference detection pixel, it is determined whether the processing target pixel is a pixel having a spectral sensitivity that has little effect on degradation of image quality when seen through the human eye (first pixel).

In the first pixel correction processing unit 22, next, it is determined whether the density y of the phase-difference detection pixels after the pixel mixing processing is equal to or greater than a prescribed threshold (first threshold). For example, the threshold is one in order to simplify the description. As illustrated in FIG. 8A, in the case where the density y=1, all the pixels of the same color are phase-difference detection pixels, and since there are no normal pixels of the same color in the surrounding area, it is difficult to perform suitable correction.

In this case, it would be preferable to perform the processing on the image data before the pixel mixing processing is performed. However, in such a case, it would be necessary to provide a correction processing circuit inside the image-capturing element 17. A CMOS or the like that would be typically used in the image-capturing element 17 is a semiconductor element in which photodiodes, color filters, and so forth are provided, and it would be difficult to realize its miniaturization compared with an ASIC. Therefore, providing and operating a correction processing circuit inside the image-capturing element 17 would result in increases in cost and power consumption compared with providing and operating a correction processing circuit inside an ASIC.

Therefore, in the correction processing performed inside the image-capturing element 17, for example, it is desirable to add together and average four surrounding pixels of the same color, which reduces the use of line memory as much as possible, simply add together and average left and right pixels of the same color, or not use the phase-difference detection pixel in the mixing.

In this embodiment, in the case where the density y☐1, it is determined whether the density x of the phase-difference detection pixels before the pixel mixing processing is lower than a prescribed threshold (second threshold). For example, in the case where the threshold is 1/16 and x☐1/16, it is considered highly probable that there will be numerous normal pixels in the area surrounding each phase-difference detection pixel and that can be used to correct the pixel value of the phase-difference detection pixel, and therefore, correction can be performed using the surrounding pixels.

Figure 9:
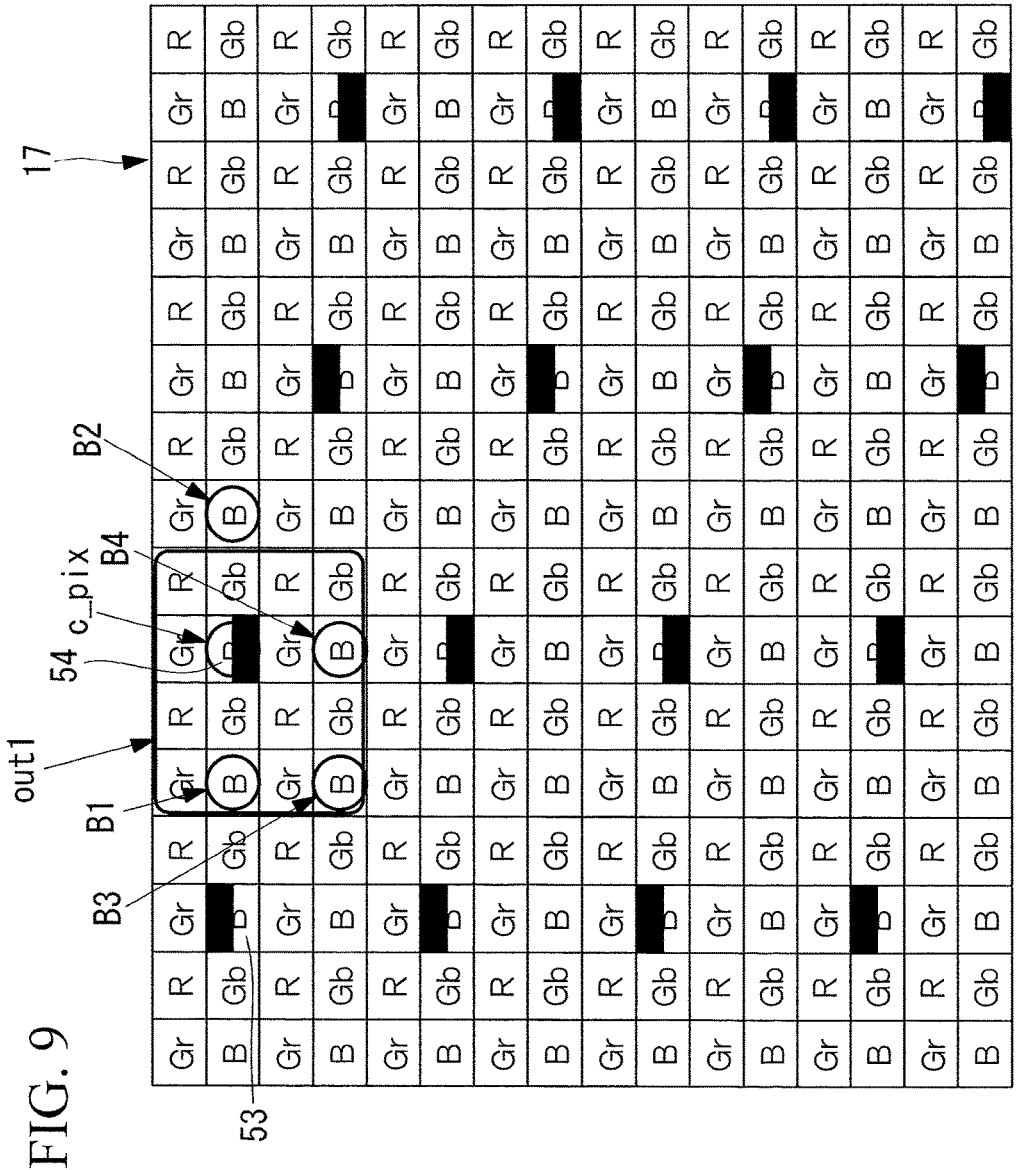
FIG. 9 is a drawing for explaining correction performed using image data before pixel mixing is performed on the pixels in FIG. 7A.

Specifically, in the case where x☐1/16, as illustrated in FIG. 9, correction is performed in which the pixel value of a phase-difference detection pixel is overwritten with the average value of normal pixels B1 and B2 on the left and right. A generated corrected value c_pix is expressed by the following formula (1).

$$c\_pix=(B1+B2)/2 \quad (1)$$

Pixel mixing processing is performed using the corrected value c_pix obtained using formula (1), and therefore, a pixel value out1 to be output from the mixing processing is obtained with the following formula (2) using the adjacent normal pixels B1, B3, and B4.

$$out1=(B1+c\_pix+B3+B4)/4 \quad (2)$$

On the other hand, in the case where x>1/16, pixel mixing processing is performed without taking the pixel value of the phase-difference detection pixel into consideration (skip mixing processing), and therefore, a pixel value output from the mixing processing is obtained using the following formula (3).

$$out1=(B1+B2+B3)/3 \quad (3)$$

Thus, the correction processing performed by the first pixel correction processing unit 22 is completed.

Next, correction processing performed by the second pixel correction processing unit 27 will be described.

Figure 6:
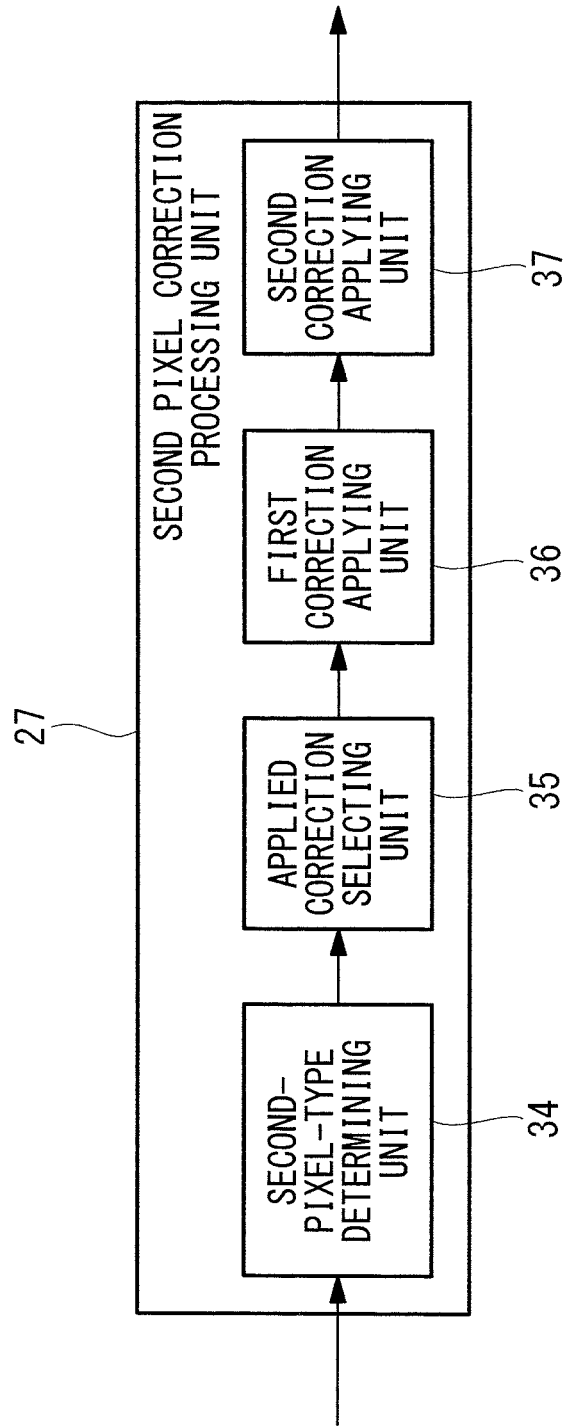
FIG. 6 is a block diagram illustrating a second pixel correction processing unit of the image-processing unit in FIG. 5.

As illustrated in FIG. 6, the second pixel correction processing unit 27 includes a second pixel type determining unit 34, a to-be-applied correction selecting unit 35, a first correction applying unit (phase-difference pixel value correcting unit) 36, and a second correction applying unit (phase-difference pixel value correcting unit) 37.

In the second pixel correction processing unit 27, the pixels that are to be subjected to processing are phase-difference detection pixels, and correction processing is performed on the phase-difference detection pixels on which correction processing has not been performed by the first pixel correction processing unit 22.

That is, in the second pixel correction processing unit 27, first, it is determined in the second pixel type determining unit 34 whether a pixel is a phase-difference detection pixel on which correction processing has not performed by the first pixel correction processing unit 22.

In the case where the pixel is such a phase-difference detection pixel, it is additionally determined in the second pixel type determining unit 34 whether the pixel is arranged at the position of a blue filter. In the case where the pixel is a phase-difference detection pixel at a position at which a color filter other than a blue filter is arranged, correction processing in which a filter coefficient of the phase-difference detection pixel is adaptively changed in accordance with pixel values in the surrounding area (first correction) is selected by the to-be-applied correction selecting unit 35.

In the case where the pixel is arranged at the position of a blue filter, different correction processing (first correction or second correction) is performed depending on the magnitude of the density y. In the case where the density y is smaller than the prescribed threshold, since there are a large number of pixels that are available in the surrounding area for correction processing, correction processing in which the filter coefficient is adaptively changed in accordance with the pixel values in the surrounding area (first correction) is selected in the to-be-applied correction selecting unit 35. In the case where the density y is equal to or higher than the prescribed threshold, correction processing in which the pixel values in the immediate vicinity are used (second correction) is selected in the to-be-applied correction selecting unit 35.

Correction processing corresponding to the first correction and the second correction selected in the to-be-applied correction selecting unit 35 is performed in the first correction-applying unit 36 and the second correction-applying unit 37 on the phase-difference detection pixels for which the corresponding correction processing has been selected.

Hereafter, an image-processing method of the image-capturing device 1 and the image-processing device 16 according to the thus-configured embodiment will be described.

Figure 10:
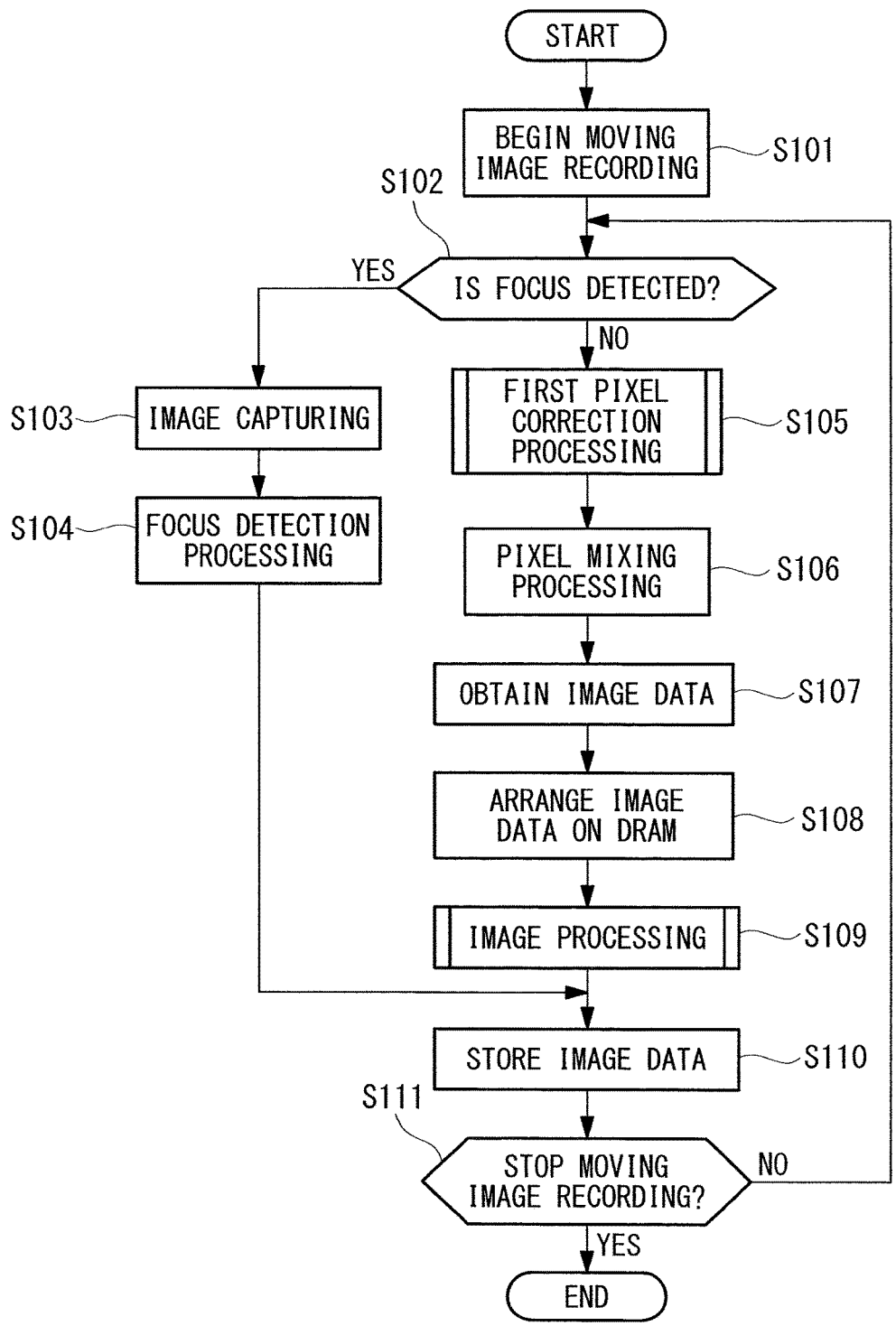
FIG. 10 is a flowchart that describes an image-processing method according to an embodiment of the present invention.

As illustrated in FIG. 10, in the image-processing method according to this embodiment, first, when the CPU 8 begins moving-image-recording light exposure (step S101), the CPU 8 determines whether the light exposure is focus-detection light exposure (step S102).

In the case where the light exposure is focus-detection light exposure, the image-capturing unit 7 performs image capturing (step S103). That is, the image-capturing element 17 performs photoelectric conversion and arranges data digitized by the image-capturing control unit 18 on the DRAM 13. Focus detection utilizing phase difference is performed by the focus-detection circuit 10 on the basis of data obtained by the phase-difference detection pixels (step S104). The CPU 8 causes the driving unit 5 to drive the photographic lens 2 so as to perform focusing on the basis of the result of the focus detection, and the processing advances to step S110.

When it is determined that the light exposure is not focus-detection light exposure in step S102, an image-capturing operation is performed by the image-capturing unit 7 (step S105). That is, the image-capturing element 17 performs photoelectric conversion, an A-AMP performs analog gain adjustment, and the A/D converter 20 converts an analog signal into a digital signal. In the pixel data, which is in the form of a digital signal, phase-difference detection pixels are corrected by the first pixel correction processing unit 22 (step S106).

Figure 11:
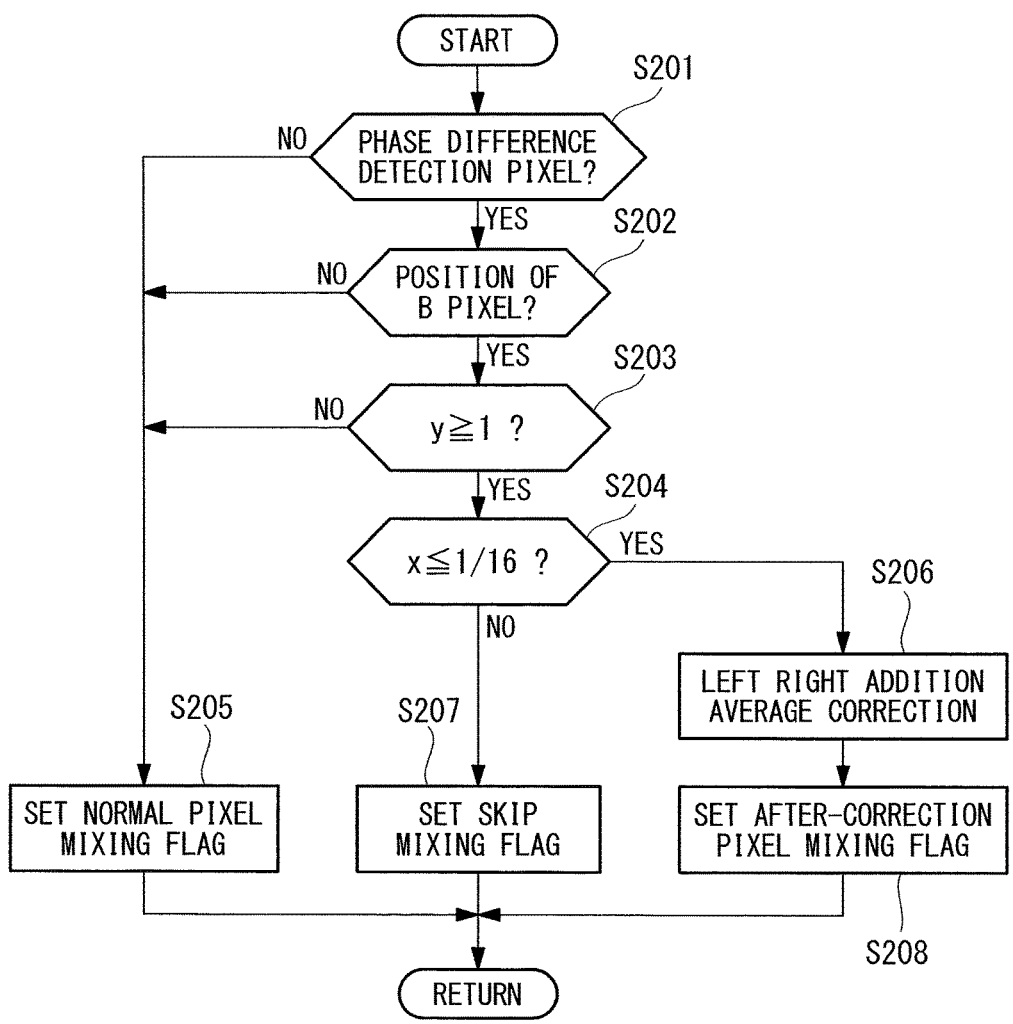
FIG. 11 is a flowchart that describes a first pixel correction processing routine in the flowchart in FIG. 10.

As illustrated in FIG. 11, in the first pixel correction processing unit 22, it is determined whether a pixel is a phase-difference detection pixel (phase-difference pixel discrimination step S201), and in the case where the pixel is a phase-difference detection pixel, it is determined whether the pixel is arranged at the position of a blue filter (step S202).

In the case where the phase-difference detection pixel is arranged at the position of a blue filter, it is determined whether the density y☐1 (step S203), and in the case where the density y☐1, it is determined whether the density x☐1/16 (step S204). In the case where the density y<1 in step S203, a flag is set indicating that pixel mixing processing is to be performed in accordance with an imaging operation mode (step S205).

In the case where x☐1/16 in step S204, a corrected value is generated using formula (1) (step S206), and a flag is set indicating that pixel mixing processing is to be performed with formula (2) using the generated corrected value (step S208). In the case where x>1/16 in step S204, a flag is set indicating that pixel mixing processing is to be performed using formula (3) (step S207).

Thus, pixel mixing processing is performed in the pixel mixing processing unit 23 inside the image-capturing control unit 18 on the basis of the flag set by the pixel-mixing determining unit 25 of the first pixel correction processing unit 22 (phase-difference pixel value correction step S106).

In this case, since the pixel value of a phase-difference detection pixel can be corrected using simple computation processing executed in the image-capturing control unit 18 and the amount of computation can be reduced, the image-processing method according to this embodiment has advantages that the use of line memory can be suppressed and reductions in cost and power consumption can be achieved.

Once the image data that has been subjected to the pixel mixing processing in the image-capturing element 17 has been acquired from the image-capturing unit 7 (step S107), the image data is written into the DRAM 13 via the bus 33 (step S108).

Next, the image-processing unit 9 reads the image data out from the DRAM 13 and performs image processing (step S109). The image data that has been subjected to the image processing is stored (step S110), and it is determined whether moving image recording is to be stopped (step S111). In the case where moving image recording is not to be stopped, the processing returns to step S102, and the processing is repeated.

Figure 12:
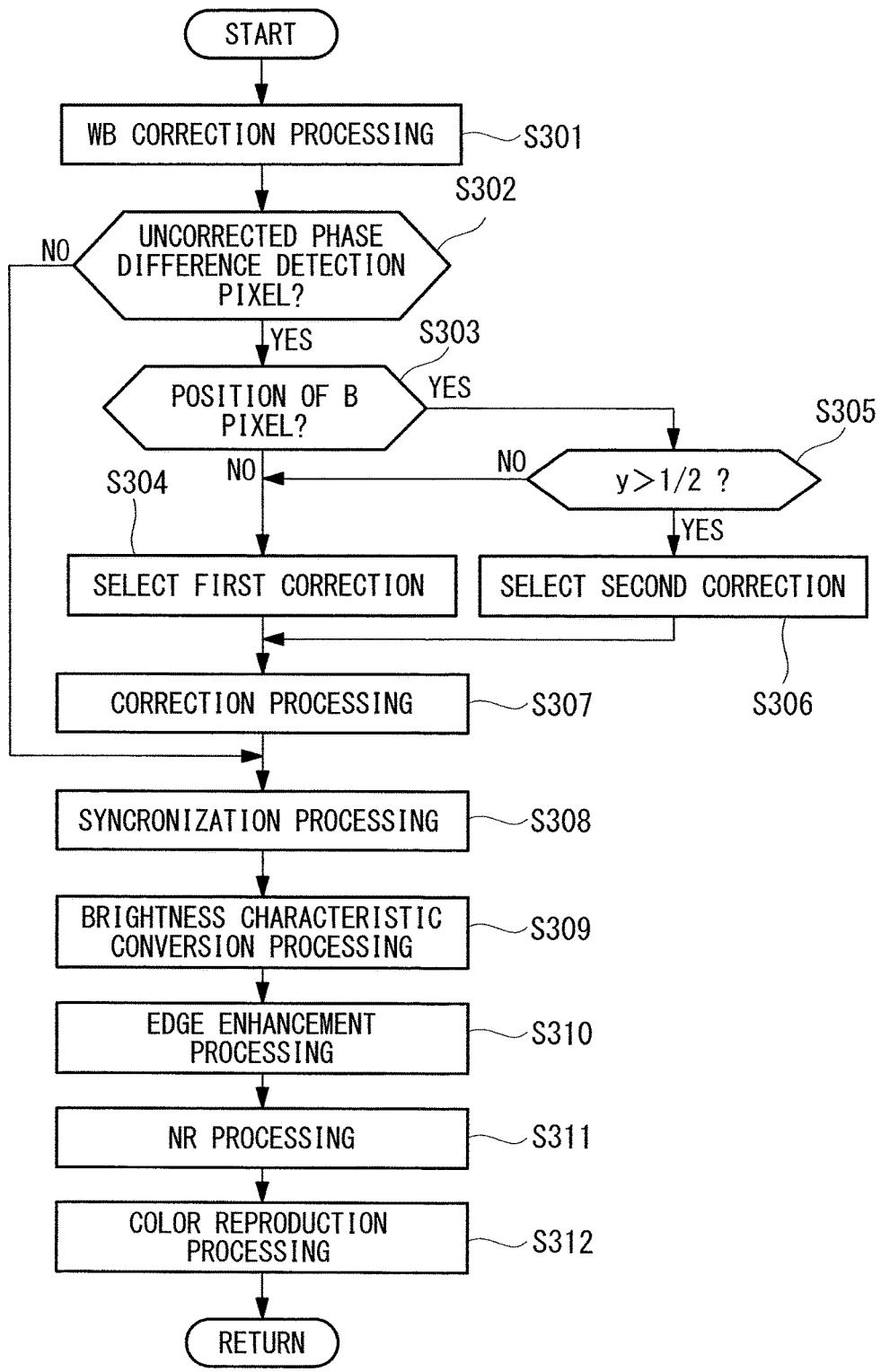
FIG. 12 is a flowchart that describes a second pixel correction processing routine in the flowchart in FIG. 10.

As illustrated in FIG. 12, in the image-processing unit 9, the WB correction processing unit 26 corrects the white balance of the image by amplifying each color component of the image data obtained from the DRAM 13 by a prescribed amount of gain (step S301).

Next, the pixel values obtained in the phase-difference detection pixels are corrected in the second pixel correction processing unit 27. It is determined in the second pixel correction processing unit 27 whether a pixel is a phase-difference detection pixel that has not been corrected in the first pixel correction processing unit 22 (phase-difference detection pixel discrimination step S302), and in the case where the pixel is a phase-difference detection pixel that has already been corrected, the pixel is not corrected and is handled in the same manner as a normal pixel.

In the case where the pixel is a phase-difference detection pixel that has not yet been corrected, it is determined whether the pixel is a phase-difference detection pixel that is arranged at the position of a green filter (step S303). In the case where the pixel is a phase-difference detection pixel that is arranged at the position of a green filter, the phase-difference detection pixel is corrected using a known correction method in which the filter coefficient is adaptively changed in accordance with the surrounding pixel values (phase-difference pixel value correction step S304). Thus, there are advantages that the pixel value of a phase-difference detection pixel arranged at the position of a green filter, which greatly affects degradation of image quality seen with the human eye, can be accurately corrected, and image quality can be improved.

On the other hand, in the case where the phase-difference detection pixel that has not yet been corrected is not arranged at the position of a green filter, i.e., the phase-difference detection pixel is arranged at the position of a blue filter, it is determined whether the density y>1/2 (step S305). In the case where the result of the determination is density y☐1/2, it is considered that there are a large number of pixels available for correction processing in the surrounding area, and therefore, the processing advances to step S304, and the same processing is performed as would be performed for a phase-difference detection pixel arranged at the position of a green filter. In the case where the result of the determination is that density y>1/2, correction processing is performed using the pixel values in the immediate vicinity (phase-difference pixel value correction step S306). In this case, the correction processing is different from that performed on the first pixels, and the correction processing can be completed by an ASIC, and the processing can be performed with low power consumption.

After the phase-difference detection pixel has been corrected (step S307), the image data is subjected to synchronization processing (step S308), and brightness characteristic conversion processing (step S309). Next, edge enhancement processing (step S310), NR processing (S311), and color reproduction processing (S312) are performed.

Thus, the image-capturing device 1, the image-processing device 16, and the image-processing method according to this embodiment have advantages in that the phase-difference detection pixels that have a greater effect on the degradation of image quality seen with the human eye (second pixels) than pixels having other spectral sensitivities can be sufficiently corrected in order to improve image quality, and in that the cost and power consumption incurred in simple correction, in which the amount of computation is reduced, performed on the phase-difference detection pixels that have a small effect on the degradation of image quality seen with the human eye (first pixels) can be reduced. Thus, image processing can be performed that realizes both sufficient image quality and low cost/low power consumption.

Regarding color filters of the phase-difference detection pixels, although color filters of the phase-difference detection pixels that are originally arranged at the positions of the individual pixels have been exemplified in order to specify the positions of the pixels in this embodiment, the present invention is not limited to this configuration. Since the pixel values of the phase-difference detection pixels are not used, red filters, green filters or blue filters may be arranged, color filters having a wider wavelength band may be arranged, or no color filters may be arranged.

In addition, although a case has been exemplified in which the light-blocking films each have a light-blocking surface area of substantially 1/2 that of the pixel in this embodiment, the present invention is not limited to this configuration. In addition, although right-opening phase-difference detection pixels 51 and left-opening phase-difference detection pixels 52 are arranged in Gr pixels, and upper-opening phase-difference detection pixels 54 and lower-opening phase-difference detection pixels 53 are arranged in B pixels, the present invention is not limited to this configuration.

In addition, although an example in which pupil division is performed by shielding part of each phase-difference detection pixel from light has been described, it is sufficient that a phase-difference detection pixel be able to selectively receive one of a pair of light flux beams from the subject that have passed through different pupil regions of the photographic lens 2, and therefore the phase-difference detection pixels may be realized by pupil division micro-lenses without the use of a configuration for shielding part of the pixel from light.

Furthermore, the density of phase-difference detection pixels may be arbitrarily chosen in this embodiment. In particular, the density in the image data arranged on the DRAM 13 is adaptively changed in accordance with the operation mode of the image-capturing element 17 or the method of mixing reading or thinning reading. Although a case of mixing together two pixels of the same color in the horizontal direction and two pixels of the same color in the vertical direction has been exemplified in this embodiment, the present invention is not limited to this configuration.

In addition, different values from those described in the embodiment may be adopted as the thresholds used in this embodiment.

Furthermore, although the amount of image data arranged on the DRAM 13 is reduced by performing pixel mixing in this embodiment, a unit that performs pixel thinning may instead be adopted as a number-of-pixels-reducing unit In addition, although a case has been exemplified in which a so-called Bayer array is adopted as the method of arraying the color filters, the present invention is not limited to this configuration, and the present invention can be similarly applied to any the image-capturing element in which phase-difference detection pixels and normal pixels are mixed together.

In addition, although a configuration in which the image-processing method is realized by hardware has been described in this embodiment, the image-processing method may instead be realized by an image-processing program that can be executed by a computer. In such a case, the computer includes a CPU, a main storage device such as a RAM, and a recording medium that is readable by the computer. The CPU can realize the same processing as that realized by the image-processing device 16 by reading out an image-processing program recording on the recording medium.

The inventor has arrived at the following aspects of the present invention.

An image-capturing device according to a first aspect of the present invention includes: an image-capturing element in which a plurality of pixels, which have different spectral sensitivities, are arrayed in a two-dimensional matrix manner and in which phase-difference detection pixels are arranged as some of the pixels; a phase-difference pixel discriminating unit that classifies the phase-difference detection pixels arranged in the image-capturing element as first pixels, the first pixels having a spectral sensitivity at which discerning degradation of image quality is more difficult for human eyes than the other of the spectral sensitivities, and second pixels which are the phase-difference detection pixels other than the first pixels; and a phase-difference pixel value correcting unit that subjects the first pixels classified by the phase-difference pixel discriminating unit to correction processing of a lower precision than that for the second pixels.

According to this aspect, the distance to a subject can be measured with a pupil phase-difference method using a plurality of phase-difference detection pixels that are arranged as some of the plurality of pixels that are provided in an image-capturing element and have different spectral sensitivities. Pixel values themselves obtained by the phase-difference detection pixels cannot be used to generate an image, and therefore, correction processing is performed on the pixel values.

In this case, according to this aspect, the phase-difference detection pixels are classified by the phase-difference pixel discriminating unit into first pixels, which have a spectral sensitivity at which discerning degradation of image quality is more difficult for human eyes, and second pixels which are the phase-difference detection pixels other than the first pixels, and the first pixels are subjected to correction processing of a lower precision than that for the second pixels by the phase-difference pixel value correcting unit.

In other words, although the image quality is degraded as a result of the correction processing of a low precision being performed on the first pixels, since the first pixels have a spectral sensitivity at which discerning degradation of image quality is difficult for human eyes, the degradation of image quality is not noticeable. Use of line memory, circuit scale, and the amount of computation can be suppressed, and power consumption can be reduced through the use of the low-precision correction processing. On the other hand, the second pixels, which are the phase-difference detection pixels other than the first pixels, are subjected to correction processing of a higher precision than that for the first pixels, and as a result, image quality can be improved.

In the above-described aspect, the phase-difference pixel discriminating unit may classify the phase-difference detection pixels that have a spectral sensitivity in a blue wavelength band as the first pixels.

With this configuration, since the blue wavelength band corresponds to a spectral sensitivity at which degradation of image quality is difficult to discern with the human eye, the degradation of image quality resulting from the low-precision correction processing is not noticeable. Therefore, the use of line memory, circuit scale, and the amount of computation can be suppressed, and power consumption can be reduced.

Furthermore, the image-capturing device according to the above-described aspect may further include a number-of-pixels-reducing unit that performs number-of-pixels reduction processing that outputs a single pixel value on the basis of pixel values of a prescribed number of the pixels of the image-capturing element; wherein, the phase-difference pixel discriminating unit classifies the phase-difference detection pixels as the first pixels when a density of the phase-difference detection pixels having a spectral sensitivity in a blue wavelength band with respect to all pixels having the spectral sensitivity in a blue wavelength band within an image after the number-of-pixels reduction processing is higher than a prescribed first threshold, and the phase-difference pixel value correcting unit subjects the first pixels to the correction processing on the basis of an image before the number-of-pixels reduction processing.

With this configuration, since the number of pixels other than the phase-difference detection pixels is small in the image after the number-of-pixels reduction processing in the case where the density of the phase-difference detection pixels having a spectral sensitivity in the blue wavelength band with respect to all the pixels of the same color of the image after performance of the number-of-pixels reduction processing by the number-of-pixels-reducing unit is higher than the first threshold, it is difficult to perform correction processing. According to this aspect, effective correction processing can be performed by performing correction processing on the first pixels on the basis of the image before the number-of-pixels reduction processing.

In addition, in the above-described aspect, in the case where a density of the phase-difference detection pixels with respect to all pixels having the spectral sensitivity in the blue wavelength band within an image before the number-of-pixels reduction processing is higher than a prescribed second threshold, the phase-difference pixel value correcting unit may subject the first pixels to correction processing of a lower precision than a case where the density is equal to or less than the second threshold.

With this configuration, for the phase-difference detection pixels that have been classified as the first pixels due to the density of the phase-difference detection pixels with respect to all pixels having a spectral sensitivity in the blue wavelength band within the image after the number-of-pixels-reducing processing being higher than the first threshold, the correction processing is additionally switched depending on whether the density of the phase-difference detection pixels with respect to all pixels having a spectral sensitivity in the blue wavelength band within the image before the number-of-pixels reduction processing is higher than the prescribed second threshold. Thus, in the case where there are a sufficient number of pixels other than the phase-difference detection pixels in the image before the number-of-pixelsreducing processing, correction processing of a higher precision is performed and image quality can be improved.

In addition, in the above-described aspect, among the phase-difference detection pixels classified as the second pixels by the phase-difference pixel discriminating unit, the phase-difference detection pixels having a spectral sensitivity in the blue wavelength band may be subjected to correction processing of a lower precision than that for the rest of the phase-difference detection pixels classified as the second pixels by the phase-difference pixel discriminating unit.

With this configuration, for the phase-difference detection pixels that have been classified as second pixels, which are the phase-difference detection pixels other than the first pixels for which the density of the phase-difference detection pixels with respect to all pixels having a spectral sensitivity in the blue wavelength band within the image after the number-of-pixels-reducing processing is higher than the first threshold, the phase-difference detection pixels having a spectral sensitivity in the blue wavelength band are subjected to correction processing of a lower precision than that for the rest of the phase-difference detection pixels. For the second pixels as well, it is possible to reduce the amount of computation and reduce power consumption by employing low-precision correction processing for the phase-difference detection pixels having a spectral sensitivity at which degradation of image quality is difficult to discern with the human eye.

Furthermore, in the above-described aspect, the number of pixels mixed together to obtain a single pixel value in the number-of-pixels-reducing unit may be changed on the basis of a operation mode of the image-capturing element or an intended use of an output of the image-capturing element.

With this configuration, for example, the amount of data processing can be reduced by increasing the number of pixels that are mixed together into a single pixel when capturing a moving image since a real time characteristic is required, and the resolution can be improved by reducing the number of pixels that are mixed together into a single pixel when capturing a still image.

In addition, an image-processing device according to another aspect of the present invention includes an image-capturing element in which a plurality of pixels having different spectral sensitivities are arrayed in a two-dimensional matrix manner, and phase-difference detection pixels are arranged as some of the pixels, the image-processing device comprising: a phase-difference pixel discriminating unit that classifies the phase-difference detection pixels arranged in the image-capturing element as first pixels, the first pixels having a spectral sensitivity at which discerning degradation of image quality is more difficult for human eyes than the other spectral sensitivities, and second pixels which are the phase-difference detection pixels other than the first pixels; and a phase-difference pixel value correcting unit that subjects the first pixels classified by the phase-difference pixel discriminating unit to correction processing of a lower precision that that for the second pixels.

Another aspect of the present invention provides an image-processing method using a plurality of pixels which have different spectral sensitivities and which are arrayed in a two-dimensional matrix manner in an image-capturing element, and phase-difference detection pixels arranged as some of the pixels, the method comprising: a phase-difference pixel discriminating step of classifying the phase-difference detection pixels as first pixels, the first pixels having a spectral sensitivity at which discerning degradation of image quality is more difficult for human eyes than the other spectral sensitivities, and second pixels which are the phase-difference detection pixels other than the first pixels; and a phase-difference pixel value correcting step of subjecting the first pixels classified in the phase-difference pixel discriminating step to correction processing of a lower precision than that for the second pixels.

Another aspect of the present invention provides an image-processing program for image-processing using a plurality of pixels which have different spectral sensitivities and which are arrayed in a two-dimensional matrix manner in an image-capturing element, and phase-difference detection pixels arranged as some of the pixels, the program causes a computer to execute: a phase-difference pixel discriminating step of classifying the phase-difference detection pixels arranged in the image-capturing element as first pixels, the first pixels having a spectral sensitivity at which discerning degradation of image quality is more difficult for human eyes than the other spectral sensitivities, and second pixels which are the phase-difference detection pixels other than the first pixels; and a phase-difference pixel value correcting step of subjecting the first pixels classified in the phase-difference pixel discriminating step to correction processing of a lower precision than that for the second pixels.

ADVANTAGEOUS EFFECTS OF INVENTION

The aforementioned aspects can achieve an effect that correction that enables image quality to be improved while reducing circuit scale can be performed on image data obtained by an image-capturing element in which a large number of phase-difference detection pixels are arranged at high density and over a wide area.

REFERENCE SIGNS LIST 1 image-capturing device
16 image-processing device
17 image-capturing element
23 pixel mixing processing unit (number-of-pixels-reducing unit)
24 first-pixel-type determining unit (phase-difference pixel discriminating unit)
25 pixel-mixing determining unit (phase-difference pixel value correcting unit)
36 first correction applying unit (phase-difference pixel value correcting unit)
37 second correction-applying unit (phase-difference pixel value correcting unit)
S106, S304, S306 phase-difference pixel value correcting step
S201, S302 phase-difference pixel discriminating step

The invention claimed is:

1. An image-capturing device comprising:
an image-capturing element in which a plurality of pixels, which have different spectral sensitivities, are arrayed in a two-dimensional matrix manner and in which phase-difference detection pixels are arranged as some of the pixels;
a phase-difference pixel discriminating unit that classifies the phase-difference detection pixels arranged in the image-capturing element as first pixels, the first pixels having a spectral sensitivity at which discerning degradation of image quality is more difficult for human eyes than the other of the spectral sensitivities, and second pixels which are the phase-difference detection pixels other than the first pixels;

a phase-difference pixel value correcting unit that subjects the first pixels classified by the phase-difference pixel discriminating unit to correction processing of a lower precision than that for the second pixels; and a number-of-pixels-reducing unit that performs number-of-pixels reduction processing that outputs a single pixel value on the basis of pixel values of a prescribed number of the pixels of the image-capturing element, wherein, the phase-difference pixel discriminating unit classifies the phase-difference detection pixels as the first pixels when a density of the phase-difference detection pixels having a spectral sensitivity in a blue wavelength band with respect to all pixels having the spectral sensitivity in a blue wavelength band within an image after the number-of-pixels reduction processing is higher than a prescribed first threshold, and the phase-difference pixel value correcting unit subjects the first pixels to the correction processing on the basis of an image before the number-of-pixels reduction processing.

2. The image-capturing device according to claim 1, wherein, in the case where a density of the phase-difference detection pixels with respect to all pixels having the spectral sensitivity in the blue wavelength band within an image before the number-of-pixels reduction processing is higher than a prescribed second threshold, the phase-difference pixel value correcting unit subjects the first pixels to correction processing of a lower precision than a case where the density is equal to or less than the second threshold.

3. The image-capturing device according to claim 1, wherein, among the phase-difference detection pixels classified as the second pixels by the phase-difference pixel discriminating unit, the phase-difference detection pixels having a spectral sensitivity in the blue wavelength band are subjected to correction processing of a lower precision than that for the rest of the phase-difference detection pixels classified as the second pixels by the phase-difference pixel discriminating unit.

4. The image-capturing device according to claim 2, wherein, among the phase-difference detection pixels classified as the second pixels by the phase-difference pixel discriminating unit, the phase-difference detection pixels having a spectral sensitivity in the blue wavelength band are subjected to correction processing of a lower precision than that for the rest of the phase-difference detection pixels classified as the second pixels by the phase-difference pixel discriminating unit.

5. The image-capturing device according to claim 3, wherein the number of pixels mixed together to obtain a single pixel value in the number-of-pixels-reducing unit is changed on the basis of a operation mode of the image-capturing element or an intended use of an output of the image-capturing element.

6. The image-capturing device according to claim 4, wherein the number of pixels mixed together to obtain a single pixel value in the number-of-pixels-reducing unit is changed on the basis of a operation mode of the image-capturing element or an intended use of an output of the image-capturing element.

* * * * *